United States Patent
Yang et al.

(10) Patent No.: US 10,263,755 B2
(45) Date of Patent: Apr. 16, 2019

(54) METHOD AND APPARATUS FOR SENDING RESPONSE INFORMATION AND COMPUTER STORAGE MEDIUM

(71) Applicant: ZTE Corporation, Shenzhen, Guangdong (CN)

(72) Inventors: Weiwei Yang, Shenzhen (CN); Chunli Liang, Shenzhen (CN); Bo Dai, Shenzhen (CN)

(73) Assignee: ZTE Corporation, Shenzhen, Guangdon (CN)

( * ) Notice: Subject to any disclaimer, the term of this patent is extended or adjusted under 35 U.S.C. 154(b) by 24 days.

(21) Appl. No.: 15/505,141

(22) PCT Filed: Apr. 27, 2015

(86) PCT No.: PCT/CN2015/077548
§ 371 (c)(1),
(2) Date: Feb. 20, 2017

(87) PCT Pub. No.: WO2016/026323
PCT Pub. Date: Feb. 25, 2016

(65) Prior Publication Data
US 2017/0272229 A1    Sep. 21, 2017

(30) Foreign Application Priority Data
Aug. 20, 2014 (CN) .......................... 2014 1 0414303

(51) Int. Cl.
*H04L 1/18* (2006.01)
*H04L 5/14* (2006.01)
(Continued)

(52) U.S. Cl.
CPC .............. *H04L 5/14* (2013.01); *H04L 1/1812* (2013.01); *H04L 1/1845* (2013.01); *H04L 5/001* (2013.01);
(Continued)

(58) Field of Classification Search
CPC ....... H04L 5/14; H04L 1/1812; H04L 5/0055; H04W 72/0406; H04W 72/0446
See application file for complete search history.

(56) References Cited

U.S. PATENT DOCUMENTS

2005/0174954 A1    8/2005 Yun
2005/0243748 A1    11/2005 Bosch
(Continued)

FOREIGN PATENT DOCUMENTS

CN    1386024 A    12/2002
CN    101588201 A    11/2009
(Continued)

OTHER PUBLICATIONS

International Search Report in international application No. PCT/CN2015/077548, dated Jul. 28, 2015, 2 pgs.
(Continued)

*Primary Examiner* — Lakeram Jangbahadur
(74) *Attorney, Agent, or Firm* — Cooper Legal Group, LLC

(57) ABSTRACT

A method and an apparatus for sending response information and a computer storage medium are disclosed. The method comprises: determining a Hybrid Automatic Repeat reQuest (HARQ) timing corresponding to a downlink subframe, wherein the downlink subframe is a downlink subframe, for which a feedback of HARQ-ACK response information is needed, and is located in a Frequency Division Duplexing (FDD) downlink or uplink frequency spectrum; and sending the HARQ-ACK response information corresponding to the downlink subframe according to the determined HARQ timing.

16 Claims, 8 Drawing Sheets

(51) Int. Cl.
 H04L 5/00 (2006.01)
 H04W 72/04 (2009.01)
(52) U.S. Cl.
 CPC .......... *H04L 5/0053* (2013.01); *H04L 5/0055* (2013.01); *H04W 72/0406* (2013.01); *H04W 72/0446* (2013.01); *H04L 1/18* (2013.01); *H04L 5/0007* (2013.01); *H04L 5/1469* (2013.01)

(56) References Cited

U.S. PATENT DOCUMENTS

| | | | | |
|---|---|---|---|---|
| 2014/0161002 | A1* | 6/2014 | Gauvreau | H04W 16/24 370/280 |
| 2014/0362746 | A1 | 12/2014 | Yang | |
| 2015/0055519 | A1 | 2/2015 | Lin et al. | |
| 2015/0295681 | A1* | 10/2015 | Liang | H04L 1/1812 370/280 |
| 2015/0304095 | A1* | 10/2015 | Larsson | H04L 1/1861 370/280 |
| 2016/0204906 | A1* | 7/2016 | Cheng | H04L 1/1854 370/280 |
| 2017/0163389 | A1* | 6/2017 | Fu | H04L 1/1861 |
| 2017/0214496 | A1* | 7/2017 | Agiwal | H04L 1/1887 |

FOREIGN PATENT DOCUMENTS

| | | |
|---|---|---|
| CN | 101197655 B | 9/2010 |
| CN | 101868028 A | 10/2010 |
| CN | 102025409 A | 4/2011 |
| CN | 102404801 A | 4/2012 |
| CN | 102546136 A | 7/2012 |
| CN | 101527886 B | 9/2012 |
| CN | 102958173 A | 3/2013 |
| CN | 102026206 B | 6/2013 |
| CN | 103188062 A | 7/2013 |
| CN | 103312470 A | 9/2013 |
| CN | 103780361 A | 5/2014 |
| WO | 2012109195 A2 | 8/2012 |
| WO | 2014051491 A1 | 4/2014 |

OTHER PUBLICATIONS

English Translation of the Written Opinion of the International Search Authority in international application No. PCT/CN2015/077548, dated Jul. 28, 2015, 4 pgs.

* cited by examiner

METHOD AND APPARATUS FOR SENDING RESPONSE INFORMATION AND COMPUTER STORAGE MEDIUM

TECHNICAL FIELD

The disclosure relates to the field of communication technologies and in particular to a method and an apparatus for sending response information and a computer storage medium.

BACKGROUND

Conventional cellular communication systems are generally designed for voice services, voice services are based on an assumption that service load scarcely changes (service load is relatively static or changes semi-statically) and the proportions of uplink services and downlink services are also symmetrical, for example, a Frequency Division Duplexing (FDD) system uses paired uplink and downlink frequency spectrums. However, this relatively static assignment of uplink and downlink frequency resources in a Long Term Evolution (LTE) system cannot adapt well to changes of services.

As Mobile Broadband (MBB) services develop rapidly in recent years, the demands for wireless communications increase continuously, and more and more application services show a feature that more downlink services are needed than uplink services and only in some certain scenarios, more uplink services are needed than downlink services. Error! Reference source not found. The uplink-downlink ratios of some typical applications are given below:

TABLE 1

| Service type | Uplink/downlink speed ratio (average) |
| --- | --- |
| Online video | 1:37 |
| Software downloading | 1:22 |
| Web browsing | 1:9 |
| Social network | 4:1 |
| Email | 1:4 |
| P2P video | 3:1 |

As shown in Table 1, downlink plays a leading role for online video, software downloading, web browsing and so on, while uplink plays the same role for social network, P2P sharing and so on.

Two duplexing modes are currently available: FDD and Time Division Duplex (TDD), for the FDD, since paired frequency spectrums are needed, resources are not utilized flexibly, moreover in consideration of the asymmetry between uplink and downlink in existing services, downlink plays a leading role in most of services, thus the utilization efficiency of the uplink frequency spectrum is relatively low and a large amount of the uplink frequency spectrum resources are not even used in many cases. For the TDD, as frequency spectrum resources are used in a time division manner, resource utilization for the TDD is higher relative to that for the FDD. To take advantage of the merits of these two duplexing modes with backward compatibility taken into consideration, one of the trends of the future duplexing technologies is fusion of the FDD and the TDD. A duplexing mode called flexible duplex emerges. That is, in a frame structure, some flexible subframes are defined which can be dynamically switched to serve as uplink subframes or downlink subframes, for example, downlink data is transmitted in the FDD uplink frequency spectrum.

In this case, because the downlink transmission is conducted in the FDD uplink frequency spectrum, to ensure the transmission of downlink data, a terminal is needed to feedback HARQ-ACK response information corresponding to the downlink data. At present, however, no related technical solution has been proposed to feedback HARQ-ACK response information in a flexible duplex scenario.

SUMMARY

In view of this, to address the existing technical problems, an embodiment of the disclosure provides:

a method for sending response information comprising:

determining a Hybrid Automatic Repeat reQuest (HARQ) timing corresponding to a downlink subframe, the downlink subframe is a downlink subframe, for which a feedback of HARQ-ACK response information is needed, and is located in a Frequency Division Duplexing (FDD) downlink or uplink frequency spectrum; and sending the HARQ-ACK response information corresponding to the downlink subframe according to the determined HARQ timing.

In the above solution, downlink subframes of an FDD system, for which a feedback of HARQ-ACK response information is needed, are grouped, and an HARQ timing corresponding to each downlink subframe group is set, and the determining the Hybrid Automatic Repeat reQuest HARQ timing corresponding to the downlink subframe includes:

determining an downlink subframe group to which the downlink subframe belongs and then determining an HARQ timing corresponding to the downlink subframe group as the HARQ timing corresponding to the downlink subframe.

In the above solution, grouping the downlink subframes of the FDD system, for which a feedback of HARQ-ACK response information is needed, includes:

grouping the downlink subframes whose corresponding subframes are downlink subframes into a first downlink subframe group and the downlink subframes whose corresponding subframes are uplink subframes into a second downlink subframe group; or, grouping the downlink subframes in the FDD downlink frequency spectrum whose corresponding subframes are downlink subframes into a first downlink subframe group, the downlink subframes in the FDD downlink frequency spectrum whose corresponding subframes are uplink subframes into a second downlink subframe group, and the downlink subframes in the FDD uplink frequency spectrum into a third subframe group, for a downlink subframe having a subframe index n, its corresponding subframe is a subframe located in the FDD uplink frequency spectrum and having a subframe index n+4.

In the above solution, setting the HARQ timing corresponding to each downlink subframe group includes:

in a case where corresponding subframes of the downlink subframes in the downlink subframe group are uplink subframes, setting the downlink subframe group to adopt an HARQ timing corresponding to the FDD system; and/or in a case where the downlink subframes in the downlink subframe group are matched with the Time Division Duplexing (TDD) uplink and downlink configuration Q, setting the downlink subframe group to adopt an HARQ timing corresponding to the TDD uplink and downlink configuration Q; and/or in a case where corresponding subframes of the downlink subframes in the downlink subframe group are downlink subframes, setting the downlink subframe group to adopt a first HARQ timing.

In the above solution, an HARQ timing corresponding to the downlink subframes of an FDD system, for which a feedback of HARQ-ACK response information is needed, is set as a second HARQ timing, and the determining the HARQ timing corresponding to the downlink subframe includes:

determining the HARQ timing corresponding to the downlink subframe according to the setting.

In the above solution, the sending the HARQ-ACK response information corresponding to the downlink subframe according to the determined HARQ timing includes:

sending, in a subframe n+k, the HARQ-ACK response information corresponding to a downlink subframe having a subframe index n, when the HARQ timing corresponding to the downlink subframe is determined to be the first or second HARQ timing, a value of k satisfies at least one of the following conditions:

the value of k is a positive integer equal to or greater than 4;

the value of k is to guarantee that the subframe n+k is a first uplink subframe after n+3; and the value of k is to guarantee that for any two uplink subframes of g uplink subframes, numbers of their respective corresponding downlink subframes, for which sending of HARQ-ACK response information is needed, have a difference of which an absolute value is not greater than a preset value, g is a positive integer greater than 1.

In the above solution, a single-cell Physical Uplink Control Channel (PUCCH) format 1b with channel selection is configured for use to send the HARQ-ACK response information, and the sending the HARQ-ACK response information corresponding to the downlink subframe according to the determined HARQ timing includes:

determining, according to the determined HARQ timing, HARQ-ACKs to be sent in uplink subframes in order of the downlink subframes in the FDD downlink frequency spectrum and the downlink subframes in the FDD uplink spectrum; or in a case where a number of corresponding downlink subframes in the FDD downlink or uplink frequency spectrum is more than 1, mapping the second downlink subframe group and then the first downlink subframe group, or mapping the downlink subframes in order of subframe indexes.

In the above solution, in a case where a number of the downlink subframes, for which sending of HARQ-ACK response information is needed, to which uplink subframes correspond is more than 4, the use of the single-cell PUCCH format 1b with channel selection is not supported.

In an embodiment, a PUCCH format 1b with channel selection in a carrier aggregation scenario is configured for use to send the HARQ-ACK response information, and the sending the HARQ-ACK response information corresponding to the downlink subframe according to the determined HARQ timing includes:

sending, according to the determined HARQ timing, the HARQ-ACK response information by taking the downlink subframes in the FDD downlink frequency spectrum to which uplink subframes correspond as downlink subframes corresponding to a primary serving cell in the carrier aggregation scenario and the downlink subframes in the FDD uplink frequency spectrum as downlink subframes corresponding to a secondary serving cell in the carrier aggregation scenario.

In the above solution, in a case where a number of the downlink subframes in the FDD uplink or downlink frequency spectrum, for which sending of HARQ-ACK response information is needed, to which uplink subframes correspond are more than 4, the use of the PUCCH format 1b with channel selection is not supported.

In the above solution, a PUCCH format 3 is configured to send the HARQ-ACK response information, and the sending the HARQ-ACK response information corresponding to the downlink subframe according to the determined HARQ timing includes:

determining, according to the determined HARQ timing, the HARQ-ACKs to be sent in uplink subframes in order of the downlink subframes in the FDD downlink frequency spectrum and the downlink subframes in the FDD uplink frequency spectrum; or in a case where a number of corresponding downlink subframes in the FDD downlink or uplink frequency spectrum is more than 1, mapping the second downlink subframe group and then the first downlink subframe group, or mapping the downlink subframes in order of subframe indexes.

In the above solution, when sending the HARQ-ACK response information corresponding to the downlink subframe according to the determined HARQ timing, a path loss (PL) parameter of a physical uplink control channel sending the HARQ-ACK response information can be estimated according to downlink subframes in the FDD uplink frequency spectrum.

An apparatus for sending response information includes: a determination module and a sending module, the determination module is configured to determine a Hybrid Automatic Repeat reQuest (HARQ) timing corresponding to a downlink subframe, the downlink subframe is a downlink subframe, for which a feedback of HARQ-ACK response information is needed, and is located in a Frequency Division Duplexing (FDD) downlink or uplink frequency spectrum; and the sending module is configured to send the HARQ-ACK response information corresponding to the downlink subframe according to the determined HARQ timing.

In the above solution, the apparatus further includes: a grouping module, the grouping module is configured to group the downlink subframes of an FDD system, for which a feedback of HARQ-ACK response information is needed, and set an HARQ timing corresponding to each downlink subframe group, and the determination module is configured to determine an downlink subframe group to which the downlink subframe belongs and then determine an HARQ timing corresponding to the downlink subframe group as the HARQ timing corresponding to the downlink subframe, according to information from the grouping module.

In the above solution, the grouping module is configured to group the downlink subframes whose corresponding subframes are downlink subframes into a first downlink subframe group and the downlink subframes whose corresponding subframes are uplink subframes into a second downlink subframe group; or, group the downlink subframes in the FDD downlink frequency spectrum whose corresponding subframes are downlink subframes into a first downlink subframe group, the downlink subframes in the FDD downlink frequency spectrum whose corresponding subframes are uplink subframes into a second downlink subframe group, and the downlink subframes in the FDD uplink frequency spectrum into a third subframe group, for a downlink subframe having a subframe index n, its corresponding subframe is a subframe located in the FDD uplink frequency spectrum and having a subframe index n+4.

In the above solution, the grouping module is further configured to:

in a case where corresponding subframes of the downlink subframes in the downlink subframe group are uplink subframes, set the downlink subframe group to adopt an HARQ timing corresponding to the FDD system; and/or in a case where the downlink subframes in the downlink subframe group are matched with the Time Division Duplexing (TDD) uplink and downlink configuration Q, set the downlink subframe group to adopt an HARQ timing corresponding to the TDD uplink and downlink configuration Q; and/or in a case where corresponding subframes of the downlink subframes in the downlink subframe group are downlink subframes, set the downlink subframe group to adopt a first HARQ timing.

In the above solution, the apparatus further includes: a setting module, the setting module is configured to set an HARQ timing corresponding to the downlink subframes of an FDD system, for which a feedback of HARQ-ACK response information is needed, as a second HARQ timing; and the determination module is configured to determine the HARQ timing corresponding to the downlink subframe according to the setting.

In the above solution, the sending module is configured to send, in a subframe n+k, the HARQ-ACK response information corresponding to a downlink subframe having a subframe index n, when the HARQ timing corresponding to the downlink subframe is determined to be the first or second HARQ timing, a value of k satisfies at least one of the following conditions:

the value of k is a positive integer equal to or greater than 4;

the value of k is to guarantee that the subframe n+k is a first uplink subframe after n+3; and the value of k is to guarantee that for any two uplink subframes of g uplink subframes, numbers of their respective corresponding downlink subframes, for which sending of HARQ-ACK response information is needed, have a difference of which an absolute value is not greater than a preset value, g is a positive integer greater than 1.

In the above solution, the sending module is configured to determine, according to the determined HARQ timing, HARQ-ACKs to be sent in uplink subframes in order of the downlink subframes in the FDD downlink frequency spectrum and the downlink subframes in the FDD uplink spectrum, in a case where a single-cell Physical Uplink Control Channel (PUCCH) format 1b with channel selection is configured for use to send the HARQ-ACK response information; or map the second downlink subframe group and then the first downlink subframe group, or map the downlink subframes in order of subframe indexes, in a case where a number of corresponding downlink subframes in the FDD downlink or uplink frequency spectrum is more than 1.

In the above solution, in a case where a number of the downlink subframes, for which sending of HARQ-ACK response information is needed, to which uplink subframes correspond is more than 4, the use of the single-cell PUCCH format 1b with channel selection is not supported.

In the above solution, the sending module is configured to send, according to the determined HARQ timing, the HARQ-ACK response information by taking the downlink subframes in the FDD downlink frequency spectrum to which uplink subframes correspond as downlink subframes corresponding to a primary serving cell in the carrier aggregation scenario and the downlink subframes in the FDD uplink frequency spectrum as downlink subframes corresponding to a secondary serving cell in the carrier aggregation scenario, in a case where a PUCCH format 1b with channel selection in a carrier aggregation scenario is configured for use to send the HARQ-ACK response information.

In the above solution, in a case where a number of the downlink subframes in the FDD uplink or downlink frequency spectrum, for which sending of HARQ-ACK response information is needed, to which uplink subframes correspond are more than 4, the use of the PUCCH format 1b with channel selection is not supported.

In the above solution, the sending module is configured to determine, according to the determined HARQ timing, the HARQ-ACKs to be sent in uplink subframes in order of the downlink subframes in the FDD downlink frequency spectrum and the downlink subframes in the FDD uplink frequency spectrum, in a case where a PUCCH format 3 is configured to send the HARQ-ACK response information; or map the second downlink subframe group and then the first downlink subframe group, or map the downlink subframes in order of subframe indexes, in a case where a number of corresponding downlink subframes in the FDD downlink or uplink frequency spectrum is more than 1.

In the above solution, the sending module is configured to estimate a path loss (PL) parameter of a physical uplink control channel sending the HARQ-ACK response information according to downlink subframes in the FDD uplink frequency spectrum.

A computer storage medium includes a set of instructions which can be executed to cause at least one processor to perform the method for sending the response information described above.

A method and an apparatus for sending response information and a computer storage medium in the embodiments of the disclosure determine an HARQ timing corresponding to a downlink subframe, the downlink subframe is a downlink subframe which needs to feedback HARQ-ACK response information and which is located in the downlink or uplink frequency spectrum of FDD, and then send the HARQ-ACK response information corresponding to the downlink subframe according to the determined HARQ timing. The technical solutions provided herein realize the feedback of HARQ-ACK response information in a flexible duplex scenario.

DETAILED DESCRIPTION

In the various embodiments of the disclosure, a Hybrid Automatic Repeat reQuest (HARQ) timing corresponding to a downlink subframe is determined, the downlink subframe is a downlink subframe, for which a feedback of HARQ-ACK response information is needed, and is located in a Frequency Division Duplexing (FDD) downlink or uplink frequency spectrum; and the HARQ-ACK response information corresponding to the downlink subframe is sent according to the determined HARQ timing.

Figure 1:
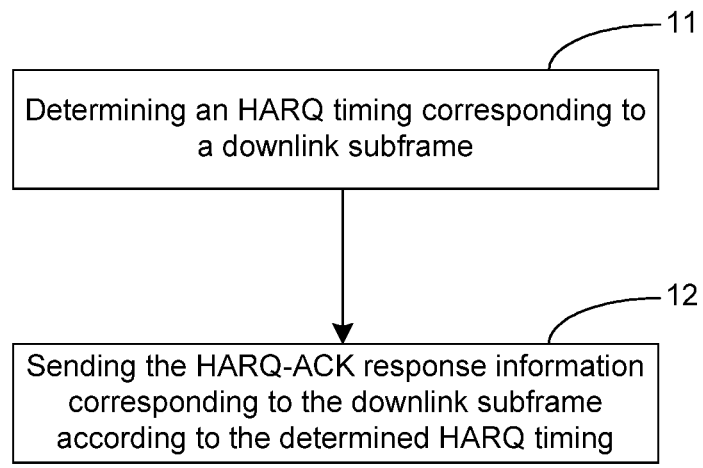
FIG. 1 is a flowchart illustrating a method for sending response information in an embodiment of the disclosure.

FIG. 1 is a flowchart illustrating a method for sending response information in an embodiment of the disclosure, and as shown in FIG. 1, the method includes:

At Step 11: an HARQ timing corresponding to a downlink subframe is determined, the downlink subframe is a downlink subframe, for which a feedback of HARQ-ACK response information is needed, and is located in a FDD downlink or uplink frequency spectrum.

At Step 12: the HARQ-ACK response information corresponding to the downlink subframe is sent according to the determined HARQ timing.

In one embodiment, downlink subframes of an FDD system, for which a feedback of HARQ-ACK response information is needed, are grouped, and an HARQ timing corresponding to each downlink subframe group is set, and the determining the HARQ timing corresponding to the downlink subframe includes:

determining an downlink subframe group to which the downlink subframe belongs and then determining an HARQ timing corresponding to the downlink subframe group as the HARQ timing corresponding to the downlink subframe.

In one embodiment, grouping the downlink subframes of the FDD system, for which a feedback of HARQ-ACK response information is needed, includes:

grouping the downlink subframes whose corresponding subframes are downlink subframes into a first downlink subframe group and the downlink subframes whose corresponding subframes are uplink subframes into a second downlink subframe group; or, grouping the downlink subframes in the FDD downlink frequency spectrum whose corresponding subframes are downlink subframes into a first downlink subframe group, the downlink subframes in the FDD downlink frequency spectrum whose corresponding subframes are uplink subframes into a second downlink subframe group, and the downlink subframes in the FDD uplink frequency spectrum into a third subframe group, for a downlink subframe having a subframe index n, its corresponding subframe is a subframe located in the FDD uplink frequency spectrum and having a subframe index n+4.

In one embodiment, setting the HARQ timing corresponding to each downlink subframe group includes:

in a case where corresponding subframes of the downlink subframes in the downlink subframe group are uplink subframes, setting the downlink subframe group to adopt an HARQ timing corresponding to the FDD system; and/or in a case where the downlink subframes in the downlink subframe group are matched with the Time Division Duplexing (TDD) uplink and downlink configuration Q, setting the downlink subframe group to adopt an HARQ timing corresponding to the TDD uplink and downlink configuration Q; and/or in a case where corresponding subframes of the downlink subframes in the downlink subframe group are downlink subframes, setting the downlink subframe group to adopt a first HARQ timing.

In one embodiment, an HARQ timing corresponding to the downlink subframes of an FDD system, for which a feedback of HARQ-ACK response information is needed, is set as a second HARQ timing, and the determining the HARQ timing corresponding to the downlink subframe includes:

determining the HARQ timing corresponding to the downlink subframe according to the setting.

In one embodiment, the sending the HARQ-ACK response information corresponding to the downlink subframe according to the determined HARQ timing includes:

sending, in a subframe n+k, the HARQ-ACK response information corresponding to a downlink subframe having a subframe index n, when the HARQ timing corresponding to the downlink subframe is determined to be the first or second HARQ timing, a value of k satisfies at least one of the following conditions:

the value of k is a positive integer equal to or greater than 4;

the value of k is to guarantee that the subframe n+k is a first uplink subframe after n+3; and the value of k is to guarantee that for any two uplink subframes of g uplink subframes, numbers of their respective corresponding downlink subframes, for which sending of HARQ-ACK response information is needed, have a difference of which an absolute value is not greater than a preset value, g is a positive integer greater than 1.

In one embodiment, a single-cell Physical Uplink Control Channel (PUCCH) format 1b with channel selection is configured for use to send the HARQ-ACK response information, and the sending the HARQ-ACK response information corresponding to the downlink subframe according to the determined HARQ timing includes:

determining, according to the determined HARQ timing, HARQ-ACKs to be sent in uplink subframes in order of the downlink subframes in the FDD downlink frequency spectrum and the downlink subframes in the FDD uplink spectrum; or in a case where a number of corresponding downlink subframes in the FDD downlink or uplink frequency spectrum is more than 1, mapping the second downlink subframe group and then the first downlink subframe group, or mapping the downlink subframes in order of subframe indexes.

In one embodiment, in a case where a number of the downlink subframes, for which sending of HARQ-ACK response information is needed, corresponding to uplink subframes is more than 4, the use of the single-cell PUCCH format 1b with channel selection is not supported In one embodiment, a PUCCH format 1b with channel selection in a carrier aggregation scenario is configured for use to send the HARQ-ACK response information, and the sending the HARQ-ACK response information corresponding to the downlink subframe according to the determined HARQ timing includes:

sending, according to the determined HARQ timing, the HARQ-ACK response information by taking the downlink subframes in the FDD downlink frequency spectrum to which uplink subframes correspond as downlink subframes corresponding to a primary serving cell in the carrier aggregation scenario and the downlink subframes in the FDD uplink frequency spectrum as downlink subframes corresponding to a secondary serving cell in the carrier aggregation scenario.

In one embodiment, in a case where a number of the downlink subframes in the FDD uplink or downlink frequency spectrum, for which sending of HARQ-ACK response information is needed, corresponding to uplink subframes are more than 4, the use of the PUCCH format 1b with channel selection is not supported.

In one embodiment, a PUCCH format 3 is configured to send the HARQ-ACK response information, and the sending the HARQ-ACK response information corresponding to the downlink subframe according to the determined HARQ timing includes:

determining, according to the determined HARQ timing, the HARQ-ACKs to be sent in uplink subframes in order of the downlink subframes in the FDD downlink frequency spectrum and the downlink subframes in the FDD uplink frequency spectrum; or in a case where a number of corresponding downlink subframes in the FDD downlink or uplink frequency spectrum is more than 1, mapping the second downlink subframe group and then the first downlink subframe group, or mapping the downlink subframes in order of subframe indexes.

In one embodiment, when sending the HARQ-ACK response information corresponding to the downlink subframe according to the determined HARQ timing, a path loss (PL) parameter of a physical uplink control channel sending the HARQ-ACK response information can be estimated according to downlink subframes in the FDD uplink frequency spectrum.

Figure 2:
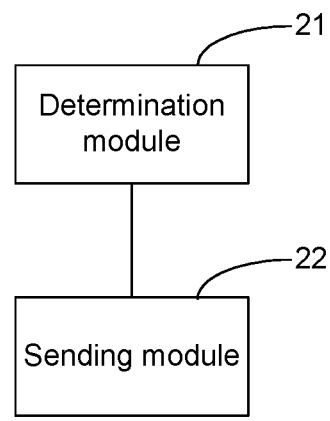
FIG. 2 is a schematic diagram illustrating a first structure of an apparatus for sending response information in an embodiment of the disclosure.

An apparatus for sending response information is accordingly provided in an embodiment of the disclosure, and as shown in FIG. 2, the apparatus includes: a determination module 21 and a sending module 22, the determination module 21 is configured to determine a Hybrid Automatic Repeat reQuest (HARQ) timing corresponding to a downlink subframe, the downlink subframe is a downlink subframe, for which a feedback of HARQ-ACK response information is needed, and is located in a Frequency Division Duplexing (FDD) downlink or uplink frequency spectrum; and the sending module 22 is configured to send the HARQ-ACK response information corresponding to the downlink subframe according to the determined HARQ timing.

Figure 3:
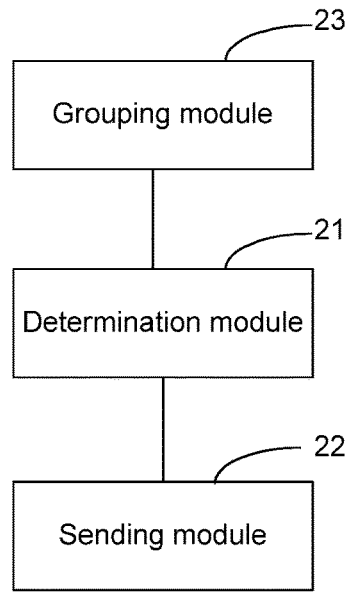
FIG. 3 is a schematic diagram illustrating a second structure of an apparatus for sending response information in an embodiment of the disclosure.

In one embodiment, as shown in FIG. 3, the apparatus further includes a grouping module 23, the grouping module 23 is configured to group the downlink subframes of an FDD system, for which a feedback of HARQ-ACK response information is needed, and set an HARQ timing corresponding to each downlink subframe group, and accordingly, the determination module 21 is particularly configured to determine an downlink subframe group to which the downlink subframe belongs and then determine an HARQ timing corresponding to the downlink subframe group as the HARQ timing corresponding to the downlink subframe, according to information from the grouping module.

In one embodiment, the grouping 23 is particularly configured to group the downlink subframes whose corresponding subframes are downlink subframes into a first downlink subframe group and the downlink subframes whose corresponding subframes are uplink subframes into a second downlink subframe group; or, group the downlink subframes in the FDD downlink frequency spectrum whose corresponding subframes are downlink subframes into a first downlink subframe group, the downlink subframes in the FDD downlink frequency spectrum whose corresponding subframes are uplink subframes into a second downlink subframe group, and the downlink subframes in the FDD uplink frequency spectrum into a third subframe group, for a downlink subframe having a subframe index n, its corresponding subframe is a subframe located in the FDD uplink frequency spectrum and having a subframe index n+4.

In one embodiment, the grouping module 23 is further configured to:

in a case where corresponding subframes of the downlink subframes in the downlink subframe group are uplink subframes, set the downlink subframe group to adopt an HARQ timing corresponding to the FDD system; and/or in a case where the downlink subframes in the downlink subframe group are matched with the Time Division Duplexing (TDD) uplink and downlink configuration Q, set the downlink subframe group to adopt an HARQ timing corresponding to the TDD uplink and downlink configuration Q; and/or in a case where corresponding subframes of the downlink subframes in the downlink subframe group are downlink subframes, set the downlink subframe group to adopt a first HARQ timing.

Figure 4:
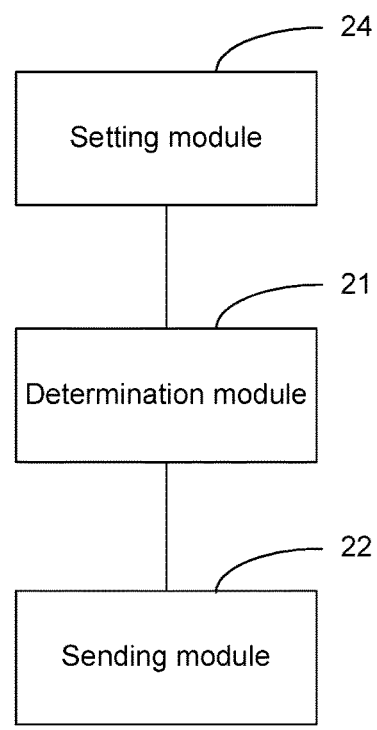
FIG. 4 is a schematic diagram illustrating a third structure of an apparatus for sending response information in an embodiment of the disclosure.

In one embodiment, as shown in FIG. 4, the apparatus further includes a setting module 24, the setting module 24 is configured to set an HARQ timing corresponding to the downlink subframes of an FDD system, for which a feedback of HARQ-ACK response information is needed, as a second HARQ timing; and accordingly, the determination module 21 is configured to determine the HARQ timing corresponding to the downlink subframe according to the setting.

In one embodiment, the sending module 22 is configured to send, in a subframe n+k, the HARQ-ACK response information corresponding to a downlink subframe having a subframe index n, when the HARQ timing corresponding to the downlink subframe is determined to be the first or second HARQ timing, a value of k satisfies at least one of the following conditions:

the value of k is a positive integer equal to or greater than 4;

the value of k is to guarantee that the subframe n+k is a first uplink subframe after n+3; and the value of k is to guarantee that for any two uplink subframes of g uplink subframes, numbers of their respective corresponding downlink subframes, for which sending of HARQ-ACK response information is needed, have a difference of which an absolute value is not greater than a preset value, g is a positive integer greater than 1.

In one embodiment, the sending module 22 is particularly configured to determine, according to the determined HARQ timing, HARQ-ACKs to be sent in uplink subframes in order of the downlink subframes in the FDD downlink frequency spectrum and the downlink subframes in the FDD uplink spectrum, in a case where a single-cell Physical Uplink Control Channel (PUCCH) format 1b with channel selection is configured for use to send the HARQ-ACK response information; or map the second downlink subframe group and then the first downlink subframe group, or map the downlink subframes in order of subframe indexes, in a case where a number of corresponding downlink subframes in the FDD downlink or uplink frequency spectrum is more than 1.

In one embodiment, in a case where a number of the downlink subframes, for which sending of HARQ-ACK response information is needed, corresponding to uplink subframes is more than 4, the use of the single-cell PUCCH format 1b with channel selection is not supported.

In one embodiment, the sending module 22 is particularly configured to send, according to the determined HARQ timing, the HARQ-ACK response information by taking the downlink subframes in the FDD downlink frequency spectrum to which uplink subframes correspond as downlink subframes corresponding to a primary serving cell in the carrier aggregation scenario and the downlink subframes in the FDD uplink frequency spectrum as downlink subframes corresponding to a secondary serving cell in the carrier aggregation scenario, in a case where a PUCCH format 1b with channel selection in a carrier aggregation scenario is configured for use to send the HARQ-ACK response information.

In one embodiment, in a case where a number of the downlink subframes in the FDD uplink or downlink frequency spectrum, for which sending of HARQ-ACK response information is needed, corresponding to uplink subframes are more than 4, the use of the PUCCH format 1b with channel selection is not supported.

In one embodiment, the sending module 22 is particularly configured to determine, according to the determined HARQ timing, the HARQ-ACKs to be sent in uplink subframes in order of the downlink subframes in the FDD downlink frequency spectrum and the downlink subframes in the FDD uplink frequency spectrum, in a case where a PUCCH format 3 is configured to send the HARQ-ACK response information; or map the second downlink subframe group and then the first downlink subframe group, or map the downlink subframes in order of subframe indexes, in a case where a number of corresponding downlink subframes in the FDD downlink or uplink frequency spectrum is more than 1.

In one embodiment, the sending module 22 is particularly configured to estimate a path loss (PL) parameter of a physical uplink control channel sending the HARQ-ACK response information according to downlink subframes in the FDD uplink frequency spectrum.

The technical solutions of the disclosure are further described in detail with reference to specific embodiments.

Embodiment 1

Figure 5:
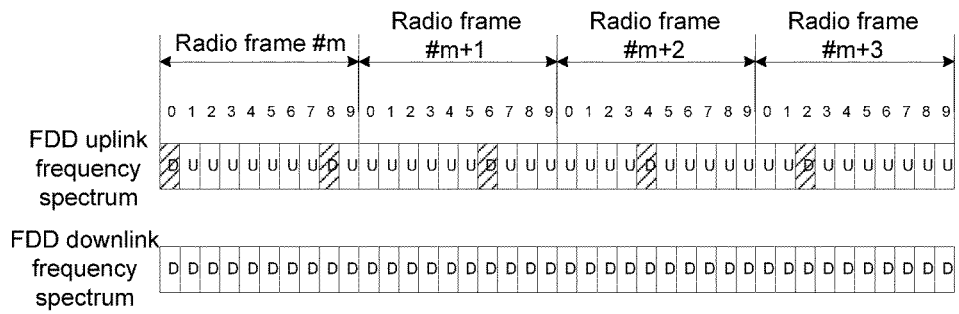
FIG. 5 is a schematic diagram illustrating use of an uplink subframe corresponding to one uplink process of the FDD uplink frequency spectrum for downlink transmission according to an embodiment of the disclosure.
Figure 6:
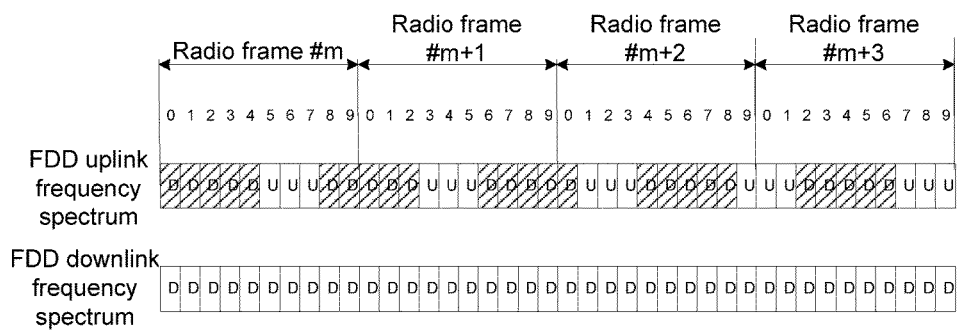
FIG. 6 is a schematic diagram illustrating use of uplink subframes corresponding to five uplink processes of the FDD uplink frequency spectrum for downlink transmission according to an embodiment of the disclosure.

A downlink subframe in the FDD uplink frequency spectrum, for which a feedback of HARQ-ACK response information is needed, is a subframe in the FDD uplink frequency spectrum used for downlink transmission, and the following modes are considerable:

Mode 1: as shown in FIG. 5 and FIG. 6, the uplink subframe(s) corresponding to Z uplink process(es) of the FDD uplink frequency spectrum is(are) used for downlink transmission, FIG. 5 shows use of an uplink subframe corresponding to one uplink process of the FDD uplink frequency spectrum for downlink transmission, that is, Z=1, and FIG. 6 shows use of uplink subframes corresponding to five uplink processes of the FDD uplink frequency spectrum for downlink transmission, that is, Z=5.

Figure 7:
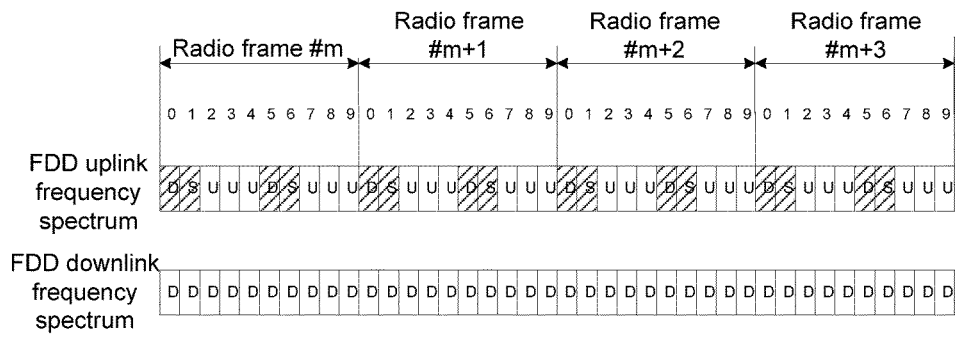
FIG. 7 is another schematic diagram illustrating a flexible configuration of the FDD uplink frequency spectrum corresponding to a flexible duplex mode 2 involved in Embodiment 1 according to an embodiment of the disclosure.

Mode 2: as shown in FIG. 7, the FDD uplink frequency spectrum is configured into a TDD carrier, and the TDD uplink and downlink configuration specified in existing protocols is adopted, specifically as shown in Table 2.

TABLE 2

| Uplink-downlink configuration | Downlink-uplink conversion point cycle | Subframe number #n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D |

Embodiment 2

The downlink subframes in the FDD uplink frequency spectrum and the FDD downlink frequency spectrum, for which a feedback of HARQ-ACK response information is needed, are grouped.

Specific Embodiment 2-1

Figure 8:
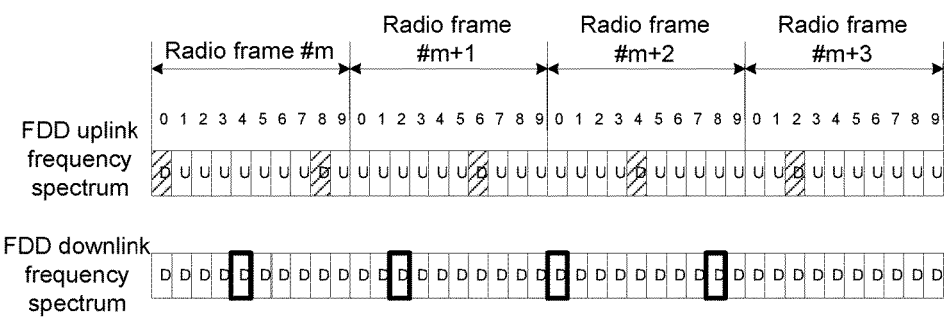
FIG. 8 is a schematic diagram illustrating a first grouping mode according to an embodiment of the disclosure.

The downlink subframes in the FDD uplink frequency spectrum and the FDD downlink frequency spectrum, for which a feedback of HARQ-ACK response information is needed, are grouped into two groups in the following mode:

a first downlink subframe group: the first downlink subframe group is made up of downlink subframes n whose corresponding subframes are downlink subframes, for example, the subframes marked by a bold black frame shown in FIG. 8; for the FDD downlink frequency spectrum: the downlink subframe #4 of the radio frame #m, the downlink subframe #2 of the radio frame #m+1 and the downlink subframe #0 of the radio frame #m+2;

a second downlink subframe group: the second downlink subframe group is made up of downlink subframes n whose corresponding subframes are uplink subframes, for example, the downlink subframes shown in FIG. 8 except for those in the first group (the subframes marked by the bold black frame).

Figure 12:
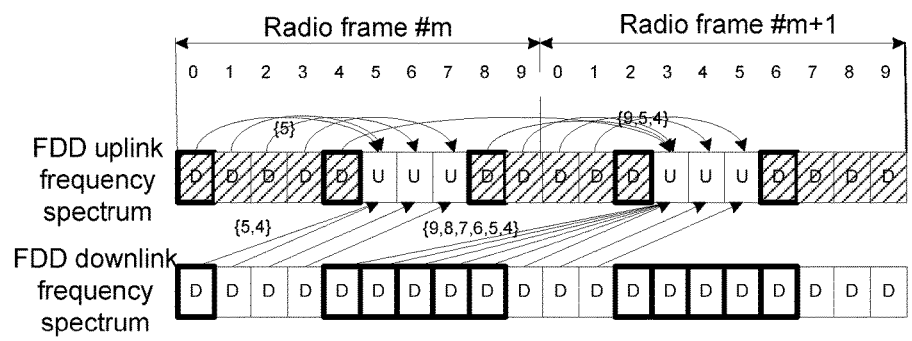
FIG. 12 is a schematic diagram illustrating a second HARQ-ACK timing according to an embodiment of the disclosure.

An HARQ timing corresponding to each downlink subframe group are determined. The first downlink subframe group adopts a first HARQ timing in which a value of k satisfies a condition that k is the smallest positive integer equal to or greater than 4, the HARQ timing corresponding to each downlink subframe is shown in FIG. 12, for example, for the FDD downlink frequency spectrum: HARQ-ACK response information corresponding to the downlink subframe #4 of the radio frame #m is sent in the uplink subframe #9 of the radio frame #m, and HARQ-ACK response information corresponding to the downlink subframe #2 of the radio frame #m+1 is sent in the uplink subframe #7 of the radio frame #m+1. And the second downlink subframe group adopts an HARQ timing corresponding to the FDD system, that is, HARQ-ACK response information corresponding to the downlink subframe having a subframe index n is sent in the subframe n+4, for example, for the FDD uplink frequency spectrum: HARQ-ACK response information corresponding to the downlink subframe #0 of the radio frame #m is sent in the uplink subframe #4 of the radio frame #m, and HARQ-ACK response information corresponding to the downlink subframe #8 of the radio frame #m is sent in the uplink subframe #2 of the radio frame #m+1.

It can be seen from this specific embodiment that the method of the embodiment of the disclosure can:

implement sending of HARQ-ACK response information in a flexible duplex scenario, use the existing HARQ timing of the FDD to the greatest extent by grouping in the foregoing mode (Mode 1) and consequentially reduce the complexity of standardization, and guarantee the minimum feedback delay of all downlink subframes and improve the system efficiency.

Specific Embodiment 2-2

Figure 9:
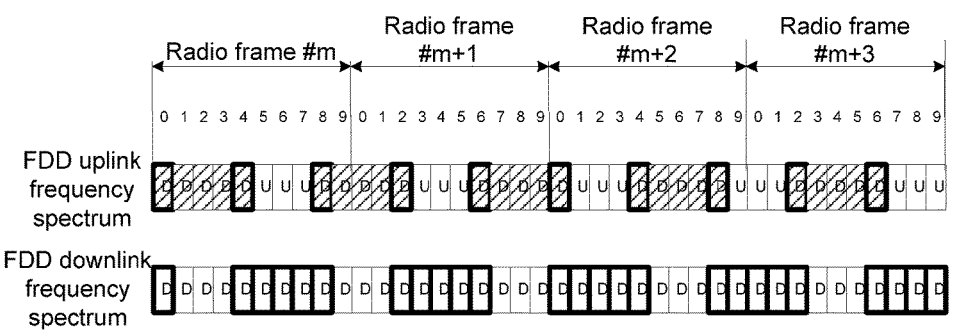
FIG. 9 is a schematic diagram illustrating a second grouping mode according to an embodiment of the disclosure.

The downlink subframes in the FDD uplink frequency spectrum and the FDD downlink frequency spectrum, for which a feedback of HARQ-ACK response information is needed, are grouped into two groups in the following mode:

a first downlink subframe group: the first downlink subframe group is made up of downlink subframes n whose corresponding subframes are downlink subframes, for example, the subframes marked by a bold black frame shown in FIG. 9, for the FDD downlink frequency spectrum: radio frame #m{downlink subframe #0, downlink subframe #4, downlink subframe #5, downlink subframe #6, downlink subframe #7, downlink subframe #8}, radio frame #m+1{downlink subframe #2, downlink subframe #3, downlink subframe #4, downlink subframe #5, downlink subframe #6}, radio frame #m+2 {downlink subframe #0, downlink subframe #1, downlink subframe #2, downlink subframe #3, downlink subframe #4, downlink subframe #8, downlink subframe #9}, and radio frame #m+3 {downlink subframe #0, downlink subframe #1, downlink subframe #2, downlink subframe #6, downlink subframe #7, downlink subframe #8, downlink subframe #9}; and for the FDD uplink frequency spectrum: radio frame #m {downlink subframe #0, downlink subframe #4, downlink subframe #7, downlink subframe #8}, radio frame #m+1 {downlink subframe #2, downlink subframe #6}, radio frame #m+2 {downlink subframe #0, downlink subframe #4, downlink subframe #8}, and radio frame #m+3 {downlink subframe #2, downlink subframe #6};

a second downlink subframe group: the second downlink subframe group is made up of downlink subframes n whose corresponding subframes are uplink subframes, for example, the downlink subframes shown in FIG. 9 except for in those in the first group (the subframes marked by a bold black frame).

Figure 13:
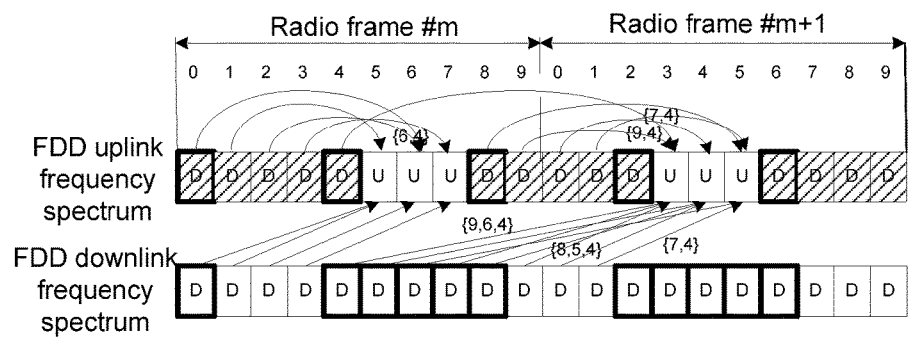
FIG. 13 is a schematic diagram illustrating an HARQ-ACK timing according to an embodiment of the disclosure.

An HARQ timing corresponding to each downlink subframe group are determined; the first downlink subframe group adopts a first HARQ timing, and the second downlink subframe group adopts an HARQ timing corresponding to the FDD system.

the first downlink subframe group adopts a first HARQ timing, the value of k satisfies a condition that k is the smallest positive integer equal to or greater than 4, the HARQ timing corresponding to each downlink subframe is shown in FIG. 13, for example, for the FDD downlink frequency spectrum: HARQ-ACK response information corresponding to the radio frame #m {downlink subframe #4, downlink subframe #5, downlink subframe #6, downlink subframe #7, downlink subframe #8} is all sent in the uplink subframe #3 of the radio frame #m+1; and for the FDD uplink frequency spectrum: HARQ-ACK response information corresponding to the downlink subframe #0 of the radio frame #m is sent in the uplink subframe #5 of the radio frame #m. The second downlink subframe group adopts the timing of the FDD, that is, HARQ-ACK response information corresponding to the downlink subframe having a subframe index n is sent in the subframe n+4.

It can be seen from this specific embodiment that the method in the embodiment of the disclosure can:

implement sending of HARQ-ACK response information in a flexible duplex scenario, use the existing HARQ timing of the FDD to the greatest extent by grouping in the foregoing mode (Mode 1 ) and consequentially reduce the complexity of standardization, and guarantee the minimum feedback delay of all downlink subframes and improve the system efficiency.

Specific Embodiment 2-3

As shown in FIG. 9, downlink subframes are grouped in the same mode as described in specific Embodiment 2-2.

An HARQ timing corresponding to each downlink subframe group is determined; the first downlink subframe group adopts a first HARQ timing, and the second downlink subframe group adopts an HARQ timing corresponding to the FDD system.

Figure 14:
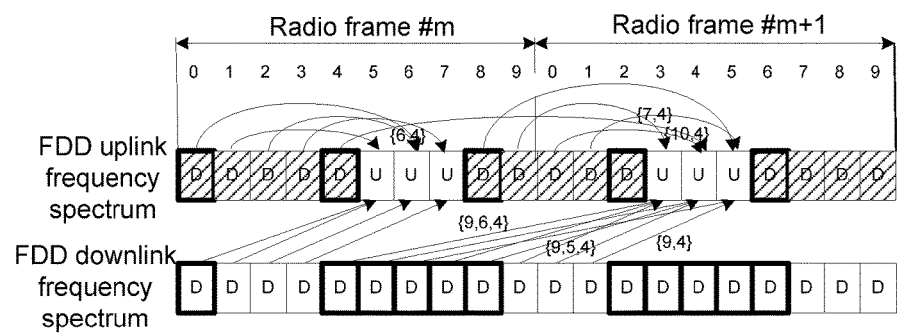
FIG. 14 is a schematic diagram illustrating an HARQ-ACK timing according to an embodiment of the disclosure.
Figure 15:
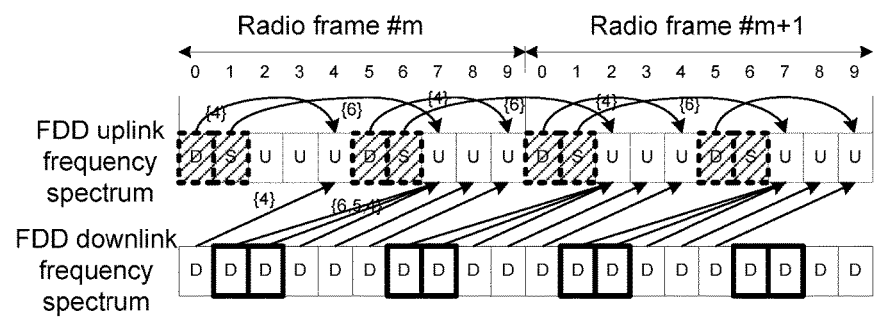
FIG. 15 is a schematic diagram illustrating an HARQ-ACK timing according to an embodiment of the disclosure.

An HARQ timing corresponding to the second downlink subframe group is determined first, and then an HARQ timing corresponding to the first downlink subframe group is determined, when a first HARQ timing corresponding to the first downlink subframe group is determined, the value of k is equal to or greater than 4, and the value of k is to guarantee the correspondence of each of g uplink subframes to an approximately equivalent number of downlink subframes, for which sending of HARQ-ACK response information is needed;

The first group of downlink subframes, for which sending of HARQ-ACK response information is needed, in the radio frame #m+1 {uplink subframe #3, uplink subframe #4 and uplink subframe #5} are the radio frame #m {downlink subframe #4, downlink subframe #5, downlink subframe #6, downlink subframe #7, downlink subframe #8} in the FDD downlink frequency spectrum and the radio frame #m {downlink subframe #4, downlink subframe #8} in the FDD uplink frequency spectrum. Because the number of pieces HARQ-ACK response information sent in the radio frame #m+1 {uplink subframe #3, uplink subframe #4 and uplink subframe #5} by the second group of downlink subframes is {2,2,2}, the sending of an approximately equivalent number of pieces of HARQ-ACK response information in each uplink subframe can be guaranteed in the following mode: for the FDD downlink frequency spectrum: {2,2,1}, and for the FDD uplink frequency spectrum: {1,0,1}. FIG. 14 only shows an instance, and any other instances in which the balanced distribution of HARQ-ACK is achieved, as shown in FIG. 15, should fall within the scope of embodiments of the disclosure.

It can be seen from this specific embodiment that the method in the embodiment of the disclosure can:

implement sending of HARQ-ACK response information in a flexible duplex scenario, use the existing HARQ timing corresponding to the FDD to the greatest extent by grouping in the foregoing Mode 1 and consequentially reduce the complexity of standardization, and guarantee the distribution of HARQ-ACK response information as balanced as possible and improve the performance of HARQ-ACK response information.

Specific Embodiment 2-4

Figure 10:
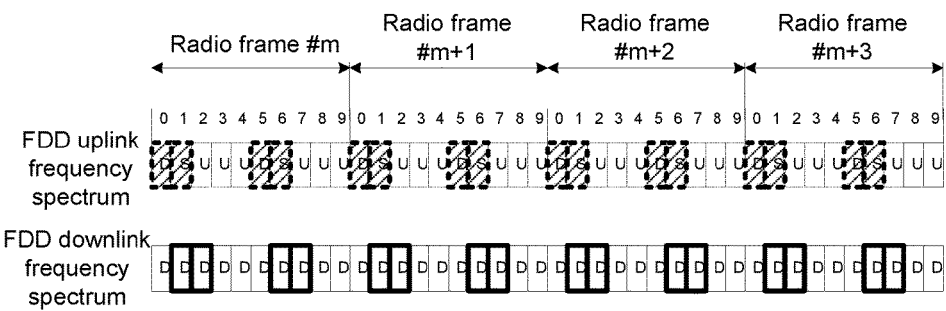
FIG. 10 is a schematic diagram illustrating a third grouping mode according to an embodiment of the disclosure.
Figure 16:
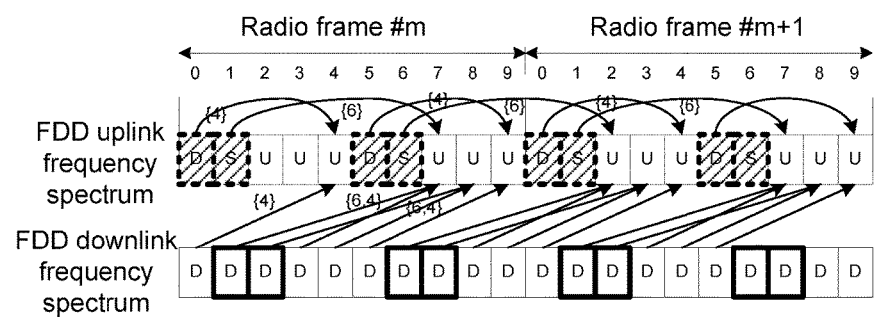
FIG. 16 is a schematic diagram illustrating an HARQ-ACK timing according to an embodiment of the disclosure.

The downlink subframes in the FDD uplink frequency spectrum and the FDD downlink frequency spectrum, for which a feedback of HARQ-ACK response information is needed, are grouped into three groups in the following mode (Mode 2):

a first downlink subframe group: the first downlink subframe group is made up of downlink subframes in the FDD downlink frequency spectrum whose corresponding subframes are downlink subframes, for example, the subframes marked by a bold black frame in FIG. 10;

a second downlink subframe group: the second downlink subframe group is made up of downlink subframes in the FDD downlink frequency spectrum whose corresponding subframes are uplink subframes, for example, the subframes marked by a black frame in FIG. 10; and a third downlink subframe group: the third downlink subframe group is made up of the downlink subframes in the FDD uplink frequency spectrum, for example, the subframes marked by a bold black dotted line frame in FIG. 10;

an HARQ timing corresponding to each downlink subframe group is determined; the first downlink subframe group adopts a first HARQ timing, the second downlink subframe group adopts an HARQ timing corresponding to the FDD system, and the third downlink subframe group adopts an HARQ timing corresponding to the TDD system.

the first downlink subframe group adopts a first HARQ timing, the value of k satisfies a condition that k is the smallest positive integer equal to or greater than 4, for example, the HARQ timing corresponding to each downlink subframe is shown in FIG. 16, for the FDD downlink frequency spectrum: HARQ-ACK response information corresponding to the radio frame #m {downlink subframe #1, downlink subframe #2} is both sent in the uplink subframe #7 of the radio frame #m+1, and HARQ-ACK response information corresponding to the radio frame #m {downlink subframe #6, downlink subframe #7} is both sent in the uplink subframe #2 of the radio frame #m+1. The second downlink subframe group adopts the timing of the FDD, that is, HARQ-ACK response information corresponding to the downlink subframe having a subframe index n is sent in the subframe n+4, for example, for the FDD downlink frequency spectrum: HARQ-ACK response information corresponding to the radio frame #m {downlink subframe #0, downlink subframe #3, downlink subframe #4, and downlink subframe #5} is sent in the radio frame #m {uplink subframe #4, uplink subframe #7, uplink subframe #8, and uplink subframe #9}; and the third group of downlink subframes satisfies the TDD uplink and downlink configuration #0, adopts an HARQ timing corresponding to the TDD uplink and downlink configuration #0, for example, for the FDD uplink frequency spectrum: HARQ-ACK response information corresponding to the radio frame #m {downlink subframe #0} is sent in the radio frame #m {uplink subframe #4}, and HARQ-ACK response information corresponding to the radio frame #m {downlink subframe #1} is sent in the radio frame #m {uplink subframe #7}.

It can be seen from this specific embodiment that the method of the embodiment of the disclosure can:

implement sending of HARQ-ACK response information in a flexible duplex scenario, use the existing HARQ timing of the FDD and TDD systems to the greatest extent by grouping in the foregoing mode (Mode 2) and consequentially reduce the complexity of standardization, and guarantee the minimum feedback delay of a part of downlink subframes and improve the system efficiency.

Specific Embodiment 2-5

The grouping mode is the same as that described in the specific Embodiment 2-4.

An HARQ timing corresponding to each downlink subframe group is determined; the first downlink subframe group adopts a first HARQ timing, the second downlink subframe group adopts an HARQ timing corresponding to the FDD system, and the third downlink subframe group adopts an HARQ timing corresponding to the TDD system.

HARQ timings corresponding to the second and third downlink subframe groups are determined first, and then the HARQ timing corresponding to the first downlink subframe group is determined; in the determination of the HARQ timing corresponding to the first downlink subframe group, the value of k is equal to or greater than 4 and the value of k is to guarantee the correspondence of each of g uplink subframes to an approximately equivalent number of downlink subframes, for which sending of HARQ-ACK response information is needed, the specific implementation is the same as Embodiment 2-4. FIG. 16 shows the HARQ timing corresponding to each downlink subframe, however, FIG. 16 only shows an instance, and any other instances in which the balanced distribution of HARQ-ACK is achieved should fall within the scope of embodiments of the disclosure.

It can be seen from this specific embodiment that the method of the embodiment of the disclosure can:

implement sending of HARQ-ACK response information in a flexible duplex scenario, use the existing HARQ timing of the FDD and TDD system to the greatest extent by grouping downlink subframes due to use of the grouping mode Mode 2 and consequentially reduce the complexity of standardization, and guarantee the distribution of HARQ-ACK response information as balanced as possible and improve the performance of HARQ-ACK response information.

Embodiment 3

The downlink subframe, for which a feedback of HARQ-ACK response information is needed, adopts a first HARQ timing, according to which the HARQ-ACK response information corresponding to a downlink subframe having a subframe index n is sent in a subframe n+k, the value of k is equal to or greater than 4, and is to guarantee the correspondence of each of g uplink subframes to an approximately equivalent number of downlink subframes, for which sending of HARQ-ACK response information is needed.

Specific Embodiment 3-1

The number of the downlink subframes, for which a feedback of HARQ-ACK response information is needed, is statistically calculated first.

Figure 17:
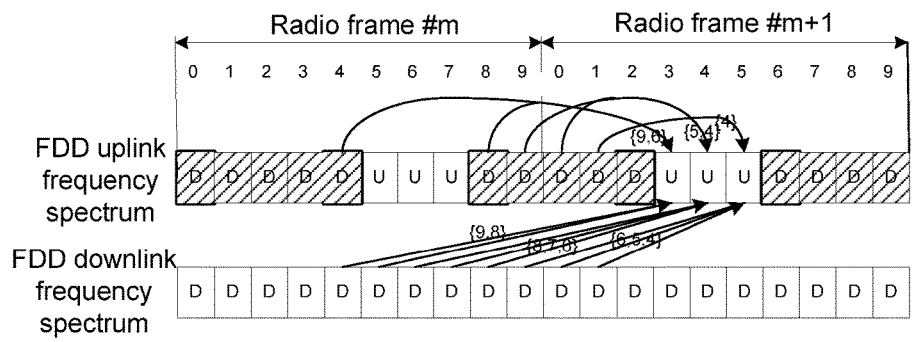
FIG. 17 is a schematic diagram illustrating an HARQ-ACK timing according to an embodiment of the disclosure.

As shown in FIG. 17, the number of the downlink subframes which are located in g successive uplink subframes and for which a feedback of HARQ-ACK response information is needed is statistically calculated. Assuming that the subframe index of the last one of the g successive uplink subframes is #w, the downlink subframes, for which a feedback of HARQ-ACK response information is needed, are downlink subframes whose subframe indexes range from #w-3-x to w-4, in the embodiment, the value of x is 8, and the value of g is 3; the downlink subframes in the FDD uplink frequency spectrum, for which a feedback of HARQ-ACK response information is needed, in the radio frame #m+1 {uplink subframe #3, uplink subframe #4, uplink subframe #5} are {radio frame #m downlink subframe #4, radio frame #m downlink subframe #8, radio frame #m downlink subframe #9, radio frame #m+1 downlink subframe #0, and radio frame #m+1 downlink subframe #1}, that is, HARQ-ACK response information corresponding to five downlink subframes is sent in three uplink subframes; the downlink subframes in the FDD downlink frequency spectrum, for which a feedback of HARQ-ACK response information is needed, in the radio frame #m+1 {uplink subframe #3, uplink subframe #4, uplink subframe #5} are {radio frame #m downlink subframe #4, radio frame #m downlink subframe #5, radio frame #m downlink subframe #6, radio frame #m downlink subframe #7, radio frame #m downlink subframe #8, radio frame #m downlink subframe #9, radio frame #m+1 downlink subframe #0, and radio frame #m+1 downlink subframe #1}, that is, HARQ-ACK response information corresponding to eight downlink subframes are sent in three uplink subframes.

Then, the value of k is determined such that the value of k is equal to or greater than 4 and each uplink subframe corresponds to an approximately equivalent number of downlink subframes, for which sending of HARQ-ACK response information is needed, an implementation mode is {4,5,4}, that is, three uplink subframes send the HARQ-ACK response information of {4,5,4} downlink subframes, respectively; the HARQ-ACK response information corresponding to five downlink subframes in the FDD uplink frequency spectrum is averagely assigned to three uplink subframes, one of the combination mode is {2,2,1}; and the HARQ-ACK response information corresponding to eight downlink subframes in the FDD downlink frequency spectrum is averagely assigned to three uplink subframes, one of the combination mode is {2,3,3}; FIG. 17 is a schematic diagram illustrating the implementation mode, and the value of k is set as shown in FIG. 17. Of course, FIG. 17 shows one implementation mode, and other implementation modes should also fall within the scope of protection of the disclosure.

Specific Embodiment 3-2

The number of the downlink subframes, for which a feedback of HARQ-ACK response information is needed, is statistically calculated first.

Figure 18:
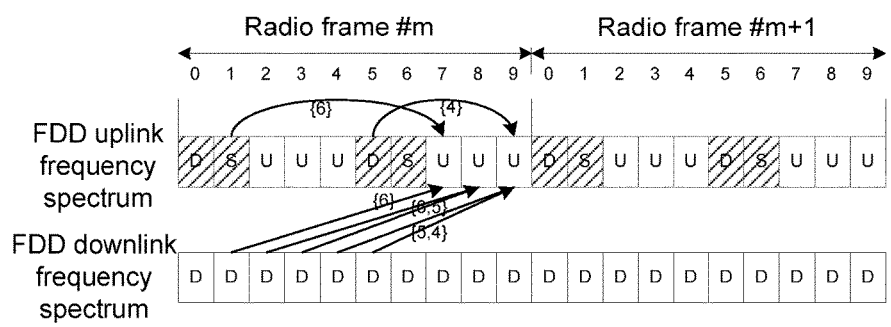
FIG. 18 is a schematic diagram illustrating an HARQ-ACK timing according to an embodiment of the disclosure.

As shown in FIG. 18, the number of the downlink subframes which are located in g successive uplink subframes and for which a feedback of HARQ-ACK response information is needed is statistically calculated. Assuming that the subframe index of the last one of the g successive uplink subframes is #w, the downlink subframes, for which a feedback of HARQ-ACK response information is needed, are downlink subframes whose subframe indexes range from #w-3-x to w-4, in the embodiment, the value of x is 5, and the value of g is 3; the downlink subframes in the FDD uplink frequency spectrum, for which a feedback of HARQ-ACK response information is needed, in the radio frame #m {uplink subframe #7, uplink subframe #8, uplink subframe #9} are {radio frame #m downlink subframe #1, radio frame #m downlink subframe #5}, that is, HARQ-ACK response information corresponding to two downlink subframes are sent in three uplink subframes; the downlink subframes in the FDD downlink frequency spectrum, for which a feedback of HARQ-ACK response information is needed, in the radio frame #m {uplink subframe #7, uplink subframe #8, uplink subframe #9} are {radio frame #m downlink subframe #1, radio frame #m downlink subframe #2, radio frame #m downlink subframe #3, radio frame #m downlink subframe #4, radio frame #m downlink subframe #5, radio frame #m downlink subframe #6}, that is, HARQ-ACK response information corresponding to five downlink subframes is sent in three uplink subframes.

Then, the value of k is determined such that the value of k is equal to or greater than 4 and each uplink subframe corresponds to an approximately equivalent number of downlink subframes, for which a feedback of HARQ-ACK response information is needed, one implementation mode is {2,2,3}, that is, three uplink subframes send the HARQ-ACK response information of {2,2,3} downlink subframes, respectively. The HARQ-ACK response information corresponding to two downlink subframes in the FDD uplink frequency spectrum is averagely assigned to three uplink subframes, one of the combination mode is {1,0,1}, and the HARQ-ACK response information corresponding to five downlink subframes in the FDD downlink frequency spectrum is averagely assigned to three uplink subframes, one of the combination mode is {1,2,3}, FIG. 18 is a schematic diagram illustrating the implementation mode, and the value of k is set as shown in FIG. 18. Of course, FIG. 18 shows one implementation mode, and other implementation modes should also fall within the scope of protection of the disclosure.

Specific Embodiment 3-3

The number of the downlink subframes, for which a feedback of HARQ-ACK response information is needed, is statistically calculated first.

Figure 19:
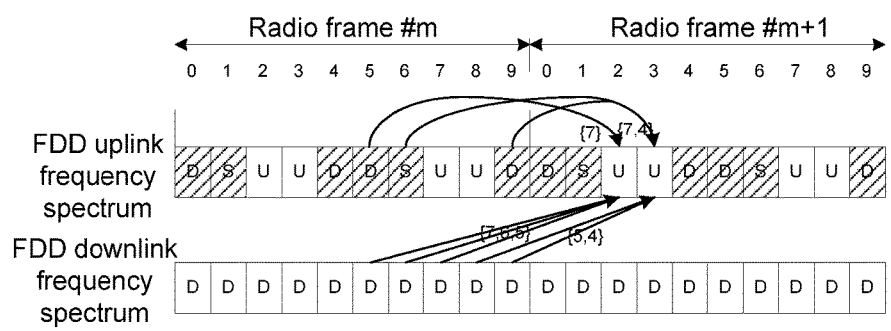
FIG. 19 is a schematic diagram illustrating an HARQ-ACK timing according to an embodiment of the disclosure.

As shown in FIG. 19, the number of the downlink subframes which are located in g successive uplink subframes and for which a feedback of HARQ-ACK response information is needed, is statistically calculated. Assuming that the subframe index of the last one of the g successive uplink subframes is #w, the downlink subframes, for which a feedback of HARQ-ACK response information is needed, are downlink subframes whose subframe indexes range from #w-3-x to w-4, in the embodiment, the value of x is 5, and the value of g is 2; the downlink subframes in the FDD uplink frequency spectrum, for which a feedback of HARQ-ACK response information is needed, in the radio frame #m+1 {uplink subframe #2, uplink subframe #3} are {radio frame #m downlink subframe #5, radio frame #m downlink subframe #6, radio frame #m downlink subframe #9}, that is, HARQ-ACK response information corresponding to three downlink subframes are sent in two uplink subframes; the downlink subframes in the FDD downlink frequency spectrum, for which a feedback of HARQ-ACK response information is needed, in the radio frame #m+1{uplink subframe #2, uplink subframe #3} are {radio frame #m downlink subframe #5, radio frame #m downlink subframe #6, radio frame #m downlink subframe #7, radio frame #m downlink subframe #8, radio frame #m downlink subframe #9}, that is, HARQ-ACK response information corresponding to five downlink subframes is sent in two uplink subframes, in other words, HARQ-ACK response information corresponding to eight downlink subframes is sent in two uplink subframes.

Figure 20:
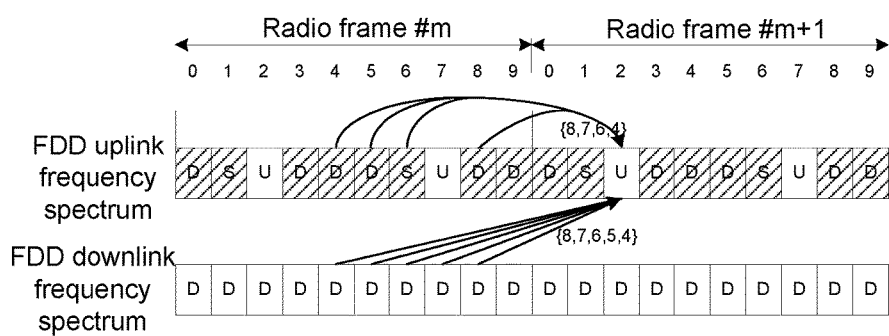
FIG. 20 is a schematic diagram illustrating an HARQ-ACK timing according to an embodiment of the disclosure.

Then, the value of k is determined such that the value of k is equal to or greater than 4 and each uplink subframe corresponds to an approximately equivalent number of downlink subframes, for which sending of HARQ-ACK response information is needed, one implementation mode is {4,4}, that is, each uplink subframe sends the HARQ-ACK response information of four downlink subframes. The HARQ-ACK response information corresponding to three downlink subframes in the FDD uplink frequency spectrum is averagely assigned to two uplink subframes, one of the combination mode is {1,2}, and the HARQ-ACK response information corresponding to five downlink subframes in the FDD downlink frequency spectrum is averagely assigned to two uplink subframes, one of the combination mode is {3,2}, FIG. 20 is a schematic diagram illustrating the implementation mode, and the value of k is set as shown in FIG. 19. Of course, FIG. 19 shows one implementation mode, and other implementation modes should also fall within the scope of protection of the disclosure.

Specific Embodiment 3-4

The number of the downlink subframes, for which a feedback of HARQ-ACK response information is needed, is statistically calculated first.

As shown in FIG. 20, the number of the downlink subframes which are located in g successive uplink subframes and for which a feedback of HARQ-ACK response information is needed, is statistically calculated. Assuming that the subframe index of the last one of the g successive uplink subframes is #w, the downlink subframes, for which a feedback of HARQ-ACK response information is needed, are downlink subframes whose subframe indexes range from #w-3-x to w-4, in the embodiment, the value of x is 10, and the value of g is 1; the downlink subframes in the FDD uplink frequency spectrum, for which a feedback of HARQ-ACK response information is needed, in the radio frame #m+1 {uplink subframe #2} are {radio frame #m downlink subframe #4, radio frame #m downlink subframe #5, radio frame #m downlink subframe #6, radio frame #m downlink subframe #8}, that is, HARQ-ACK response information corresponding to four downlink subframes are sent in one uplink subframe; the downlink subframes in the FDD downlink frequency spectrum, for which a feedback of HARQ-ACK response information is needed, in the radio frame #m+1{uplink subframe #2} are {radio frame #m downlink subframe #4, radio frame #m downlink subframe #5, radio frame #m downlink subframe #6, radio frame #m downlink subframe #7, radio frame #m downlink subframe #8}, that is, HARQ-ACK response information corresponding to five downlink subframes is sent in one uplink subframe, in other words, HARQ-ACK response information corresponding to nine downlink subframes is sent in one uplink subframe.

Then, the value of k is determined, and as the value of g is 1, the value of k is given as shown in FIG. 20.

Specific Embodiment 3-5

The number of the downlink subframes, for which a feedback of HARQ-ACK response information is needed, is statistically calculated first.

Figure 21:
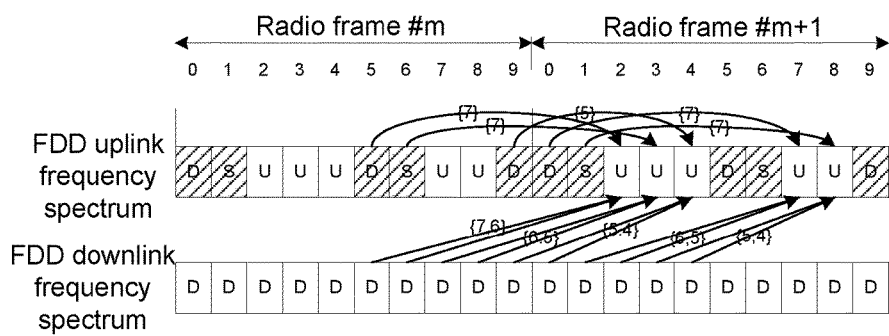
FIG. 21 is a schematic diagram illustrating an HARQ-ACK timing according to an embodiment of the disclosure.

As shown in FIG. 21, the number of the downlink subframes which are located in g successive uplink subframes and for which a feedback of HARQ-ACK response information is needed, is statistically calculated. Assuming that the subframe index of the last one of the g successive uplink subframes is #w, the downlink subframes, for which a feedback of HARQ-ACK response information is needed, are downlink subframes whose subframe indexes range from #w-3-x to w-4, in the embodiment, the value of x is 10, and the value of g is 5; the downlink subframes in the FDD uplink frequency spectrum, for which a feedback of HARQ-ACK response information is needed, in the radio frame #m+1 {uplink subframe #2, uplink subframe #3, uplink subframe #4, uplink subframe #7, uplink subframe #8} are {radio frame #m downlink subframe #5, radio frame #m downlink subframe #6, radio frame #m downlink subframe #9, radio frame #m+1 downlink subframe #0, radio frame #m+1 downlink subframe #1, radio frame #m+1 downlink subframe #2}, that is, HARQ-ACK response information corresponding to five downlink subframes is sent in five uplink subframes; the downlink subframes in the FDD downlink frequency spectrum, for which a feedback of HARQ-ACK response information is needed, in the radio frame #m+1{uplink subframe #2, uplink subframe #3, uplink subframe #4, uplink subframe #7, uplink subframe #8} are {radio frame #m downlink subframe #5, radio frame #m downlink subframe #6, radio frame #m downlink subframe #7, radio frame #m downlink subframe #8, radio frame #m downlink subframe #9, radio frame #m+1 downlink subframe #0, radio frame #m+1 downlink subframe #1, radio frame #m+1 downlink subframe #2, radio frame #m+1 downlink subframe #3, radio frame #m+1 downlink subframe #4}, that is, HARQ-ACK response information corresponding to ten downlink subframes is sent in five uplink subframes, in other words, HARQ-ACK response information corresponding to fifteen downlink subframes is sent in five uplink subframes.

Then, the value of k is determined such that the value of k is equal to or greater than 4 and each uplink subframe corresponds to an approximately equivalent number of downlink subframes, for which sending of HARQ-ACK response information is needed, one implementation mode is {3, 3, 3, 3, 3}, that is, each uplink subframe sends the HARQ-ACK response information of three downlink subframes. HARQ-ACK response information corresponding to five downlink subframes in the FDD uplink frequency spectrum is averagely assigned to five uplink subframes, one of the combination mode is {1, 1, 1, 1, 1}, and HARQ-ACK response information corresponding to ten downlink subframes in the FDD downlink frequency spectrum is averagely assigned to five uplink subframes, one of the combination mode is {2, 2, 2, 2, 2}, FIG. 20 is a schematic diagram illustrating the implementation mode, and the value of k is set as shown in FIG. 21. Of course, FIG. 21 shows one implementation mode, and other implementation modes should also fall within the scope of protection of the disclosure.

It can be seen from this embodiment that the method in the embodiment of the disclosure can:

implement sending of HARQ-ACK response information in a flexible duplex scenario; and guarantee the distribution of HARQ-ACK response information as balanced as possible and improve the performance of HARQ-ACK response information.

The problem is avoided that the HARQ-ACK response information of an earlier scheduled downlink subframe is sent later.

Embodiment 4

Specific Embodiment 4-1

Sending the HARQ-ACK response information corresponding to the downlink subframe according to the determined HARQ timing refers to: determining, according to the determined HARQ timing, the HARQ-ACK(j) to be sent in an uplink subframe #k in order of {downlink subframes in the FDD downlink frequency spectrum, downlink subframes in the FDD uplink frequency spectrum}, in a case where a single-cell PUCCH format 1b with channel selection is configured for use to send HARQ-ACK response information.

If a number of corresponding downlink subframes in the FDD downlink or uplink frequency spectrum is more than 1, the second downlink subframe group and then the first downlink subframe group are mapped, or the downlink subframes are mapped in order of subframe indexes.

If an uplink subframe #L corresponds to more than 4 downlink subframes, for which sending of HARQ-ACK response information is needed, the use of the single-cell PUCCH format 1b with channel selection is not supported.

Figure 11:
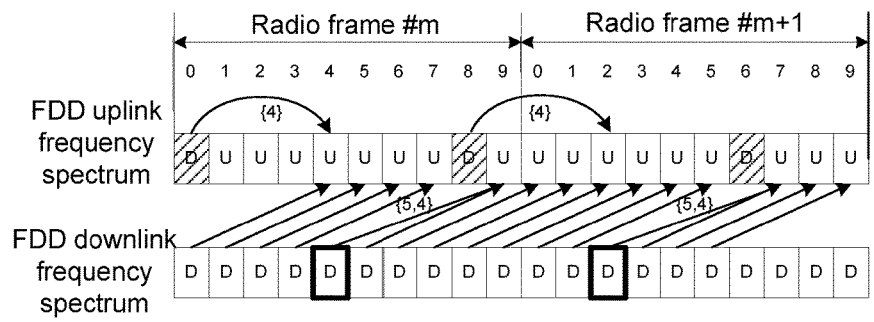
FIG. 11 is a schematic diagram illustrating a first HARQ-ACK timing according to an embodiment of the disclosure.

As shown in FIG. 11, for the uplink subframe 4 of the radio frame #m, HARQ (0) is HARQ-ACK response information corresponding to the downlink subframe #0 of the radio frame #m in the FDD downlink frequency spectrum, and HARQ (1) is HARQ-ACK response information corresponding to the downlink subframe #0 of the radio frame #m in the FDD uplink frequency spectrum.

For the uplink subframe #9 of the radio frame #m, HARQ (0) is HARQ-ACK response information corresponding to the downlink subframe #5 of the radio frame #m in the FDD downlink frequency spectrum, and HARQ (1) is HARQ-ACK response information corresponding to the downlink subframe #4 of the radio frame #m in the FDD downlink frequency spectrum.

As shown in FIG. 12, because according to the determined HARQ timing, the uplink subframe #3 of the radio frame #m+1 corresponds to nine downlink subframes, the use of a single-cell PUCCH format 1b with channel selection is not supported.

Sending the HARQ-ACK response information corresponding to the downlink subframe according to the determined HARQ timing refers to: taking a downlink subframe in the FDD downlink frequency spectrum to which the uplink subframe #L corresponds as a downlink subframe corresponding to a primary serving cell in a carrier aggregation scenario and a downlink subframe in the FDD uplink frequency spectrum as a downlink subframe corresponding to a secondary serving cell in a carrier aggregation scenario, in a case where a PUCCH format 1b with channel selection in a carrier aggregation scenario is configured for use to send HARQ-ACK response information.

If the uplink subframe #L corresponds to more than 4 downlink subframes in the FDD uplink or downlink frequency spectrum, the use of the PUCCH format 1b with channel selection is not supported.

As shown in FIG. 11, for the uplink subframe #4 of the radio frame #m, the downlink subframe #0 of the radio frame #m in the FDD downlink frequency spectrum is taken as a downlink subframe corresponding to a primary serving cell in a carrier aggregation scenario, and the downlink subframe #0 of the radio frame #m in the FDD uplink frequency spectrum is taken as a downlink subframe corresponding to a secondary serving cell in a carrier aggregation scenario.

As shown in FIG. 12, for the uplink subframe #3 of the radio frame #m, the use of a PUCCH format 1b with channel selection is not supported, because according to the determined HARQ timing, the uplink subframe #3 of the radio frame #m corresponds to three downlink subframes in the FDD uplink frequency spectrum and six downlink subframes in the FDD downlink frequency spectrum.

As shown in FIG. 13, for the uplink subframe #3 of the radio frame #m, a PUCCH format 1b with channel selection in a carrier aggregation scenario is used, because according to the determined HARQ timing, the uplink subframe #3 of the radio frame #m corresponds to two downlink subframes in the FDD uplink frequency spectrum and three downlink subframes in the FDD downlink frequency spectrum, the specific implementation of the PUCCH format 1b with channel selection is the same as that of a PUCCH format 1b with channel selection in an inter-band TDD aggregation scenario belong to an existing technology, and no description is given here repeatedly.

Of course, it is applicable that some of subframes use a single-cell PUCCH format 1b with channel selection and the other subframes use a PUCCH format 1b with channel selection in a carrier aggregation scenario, and use of the single-cell PUCCH format 1b with channel selection may be implemented by limiting the number of the downlink subframes in the FDD uplink frequency spectrum, for example, use of the single-cell PUCCH format 1b with channel selection may be implemented by limiting the value Z to be 3 in a flexible duplex mode. Compared with the PUCCH format 1b with channel selection used in a carrier aggregation scenario, use of the single-cell PUCCH format 1b with channel selection requests no time-domain binding and therefore the throughput of the downlink can be further improved.

Specific Embodiment 4-2

Sending the HARQ-ACK response information corresponding to the downlink subframe according to the determined HARQ timing refers to: determining, according to the determined HARQ timing, the HARQ-ACK(j) to be sent in an uplink subframe #k in order of {downlink subframes in the FDD downlink frequency spectrum, downlink subframes in the FDD uplink frequency spectrum}, in a case where a PUCCH format 3 is configured to send HARQ-ACK response information.

In a case where there is more than one downlink subframe corresponding to the FDD downlink or uplink frequency spectrum, the second downlink subframe group is mapped first, and then the first downlink subframe group is mapped, or the downlink subframes are mapped in order of subframe indexes.

In another embodiment, a data transmission software is also provided which can perform the technical solutions described in the foregoing embodiments and particular embodiments.

In still another embodiment, a computer storage medium is also provided in which the foregoing software is stored and which includes, but is not limited to, an optical disk, a floppy disk, a hard disk, an erasable memory and so on.

Each of the foregoing modules can be implemented as a Central Processing Unit (CPU), a Digital Signal Processor (DSP) or a Field Programmable Gate Array (FPGA) in an electronic device.

It will be appreciated by those skilled in the art that the embodiments of the disclosure can be provided as methods, systems or computer program products. Thus, the disclosure can be embodied as hardware, software or the combinations of hardware and software. Moreover, the disclosure may be embodied as a computer program product implemented on one or more computer applicable storage media (including, but not limited to, a disk memory, an optical memory and so on) in which computer applicable program codes are included.

The description is made with reference to the flowcharts and/or the block diagrams of the methods, the apparatuses (systems) and the computer program products according to the embodiments of the disclosure. It should be appreciated that each flow and/or block or the combinations of the flows and/or the blocks shown in the flowcharts and/or block diagrams can be realized by computer program instructions. These computer program instructions can be provided to the processor of a general computer, a dedicated computer, an embedded processor or another programmable data processor to generate a machine, so that a device for realizing a function designated by one or more flows and/or blocks shown in the flowcharts and/or block diagrams is generated through the execution of the instructions by the processor of the computer or another programmable data processor.

These computer program instructions may also be stored in a computer-readable memory which is capable of guiding a computer or another programmable data processor to work in a specific mode, thereby generating, using the instructions stored in the computer readable memory, a product including an instruction device for realizing a function designated by one or more flows and/or blocks shown in the flowcharts and/or block diagrams.

These computer program instructions may also be loaded onto a computer or another programmable data processor so that a series of operations is carried out on the computer or the other programmable data processor to generate a computer-realized processing, thereby enabling the instructions executed on the computer or the other programmable device to provide steps for realizing the functions designated by one or more flows and/or blocks shown in the flowcharts and/or block diagrams.

On this basis, the embodiments of the disclosure further provides a computer storage medium which includes a set of instructions which, when executed, cause at least one processor to perform the foregoing methods for sending response information.

What are described above are merely particular embodiments of the disclosure, but are not construed as limiting the scope of protection of the disclosure.

What is claimed is:

1. A method for sending response information comprising:
   determining a Hybrid Automatic Repeat reQuest (HARQ) timing corresponding to a downlink subframe, wherein the downlink subframe is a downlink subframe, for which a feedback of HARQ-ACK response information is needed, wherein the downlink subframe is to be transmitted with frequency spectrum sourced from a Frequency Division Duplexing (FDD) downlink frequency spectrum and a FDD uplink frequency spectrum; and
   sending the HARQ-ACK response information corresponding to the downlink subframe according to the determined HARQ timing;
   wherein downlink subframes of an FDD system, for which a feedback of HARQ-ACK response information is needed, are grouped, and an HARQ timing corresponding to each downlink subframe group is set, and the determining the HARQ timing corresponding to the downlink subframe comprises:
      determining a downlink subframe group to which the downlink subframe belongs and then determining an HARQ timing corresponding to the downlink subframe group as the HARQ timing corresponding to the downlink subframe;
   wherein grouping the downlink subframes of the FDD system, for which a feedback of HARQ-ACK response information is needed, comprises:
      grouping downlink subframes whose corresponding subframes are downlink subframes into a first downlink subframe group and downlink subframes whose corresponding subframes are uplink subframes into a second downlink subframe group; or, grouping downlink subframes in the FDD downlink frequency spectrum whose corresponding subframes are downlink subframes into a first downlink subframe group, downlink subframes in the FDD downlink frequency spectrum whose corresponding subframes are uplink subframes into a second downlink subframe group, and downlink subframes in the FDD uplink frequency spectrum into a third subframe group,
   wherein for a downlink subframe having a subframe index n, a corresponding subframe of the downlink subframe having a subframe index n is a subframe located in the FDD uplink frequency spectrum and having a subframe index n+4.

2. The method according to claim 1, wherein setting the HARQ timing corresponding to each downlink subframe group comprises:
   in a case where corresponding subframes of the downlink subframes in the downlink subframe group are uplink subframes, setting the downlink subframe group to adopt an HARQ timing corresponding to the FDD system; or
   in a case where the downlink subframes in the downlink subframe group are matched with the Time Division Duplexing (TDD) uplink and downlink configuration Q, setting the downlink subframe group to adopt an HARQ timing corresponding to the TDD uplink and downlink configuration Q; or
   in a case where corresponding subframes of the downlink subframes in the downlink subframe group are downlink subframes, setting the downlink subframe group to adopt a first HARQ timing.

3. The method according to claim 2, wherein the sending the HARQ-ACK response information corresponding to the downlink subframe according to the determined HARQ timing comprises:
   sending, in a subframe n+k, the HARQ-ACK response information corresponding to the downlink subframe having the subframe index n, when the HARQ timing corresponding to the downlink subframe is determined to be the first HARQ timing or the second HARQ timing,
   wherein a value of k satisfies at least one of the following conditions:
      the value of k is a positive integer equal to or greater than 4;
      the value of k is to guarantee that the subframe n+k is a first uplink subframe after n+3; or
      the value of k is to guarantee that for any two uplink subframes of g uplink subframes, numbers of respective corresponding downlink subframes of the two uplink subframes, for which sending of HARQ-ACK response information is needed, have a difference of which an absolute value is not greater than a preset value, wherein g is a positive integer greater than 1.

4. The method according to claim 1, wherein an HARQ timing corresponding to downlink subframes of an FDD system, for which a feedback of HARQ-ACK response information is needed, is set as a second HARQ timing, and the determining the HARQ timing corresponding to the downlink subframe comprises:

determining the HARQ timing corresponding to the downlink subframe according to the setting.

5. The method according to claim 4, wherein the sending the HARQ-ACK response information corresponding to the downlink subframe according to the determined HARQ timing comprises:

sending, in a subframe n+k, the HARQ-ACK response information corresponding to the downlink subframe having the subframe index n, when the HARQ timing corresponding to the downlink subframe is determined to be the first HARQ timing or the second HARQ timing, wherein a value of k satisfies at least one of the following conditions:

the value of k is a positive integer equal to or greater than 4;
    the value of k is to guarantee that the subframe n+k is a first uplink subframe after n+3; or
  the value of k is to guarantee that for any two uplink subframes of g uplink subframes, numbers of respective corresponding downlink subframes of the two uplink subframes, for which sending of HARQ-ACK response information is needed, have a difference of which an absolute value is not greater than a preset value, wherein g is a positive integer greater than 1.

6. The method according to claim 1, wherein a single-cell Physical Uplink Control Channel (PUCCH) format 1b with channel selection is configured for use to send the HARQ-ACK response information, and the sending the HARQ-ACK response information corresponding to the downlink subframe according to the determined HARQ timing comprises:

determining, according to the determined HARQ timing, HARQ-ACKs to be sent in uplink subframes in order of the downlink subframes in the FDD downlink frequency spectrum and the downlink subframes in the FDD uplink frequency spectrum; or
  in a case where a number of corresponding downlink subframes in the FDD downlink frequency spectrum or the FDD uplink frequency spectrum is more than 1, mapping the second downlink subframe group and then the first downlink subframe group, or mapping the downlink subframes in order of subframe indexes.

7. The method according to claim 6, wherein in a case where a number of the downlink subframes, for which sending of HARQ-ACK response information is needed, corresponding to uplink subframes is more than 4, the use of the single-cell PUCCH format 1b with channel selection is not supported.

8. The method according to claim 1, wherein a PUCCH format 1b with channel selection in a carrier aggregation scenario is configured for use to send the HARQ-ACK response information, and the sending the HARQ-ACK response information corresponding to the downlink subframe according to the determined HARQ timing comprises:

sending, according to the determined HARQ timing, the HARQ-ACK response information by taking downlink subframes in the FDD downlink frequency spectrum to which uplink subframes correspond as downlink subframes corresponding to a primary serving cell in the carrier aggregation scenario and downlink subframes in the FDD uplink frequency spectrum as downlink subframes corresponding to a secondary serving cell in the carrier aggregation scenario.

9. The method according to claim 8, wherein in a case where a number of the downlink subframes in the FDD uplink frequency spectrum or the FDD downlink frequency spectrum, for which sending of HARQ-ACK response information is needed, corresponding to uplink subframes are more than 4, the use of the PUCCH format 1b with channel selection is not supported.

10. The method according to claim 1, wherein a PUCCH format 3 is configured to send the HARQ-ACK response information, and the sending the HARQ-ACK response information corresponding to the downlink subframe according to the determined HARQ timing comprises:

determining, according to the determined HARQ timing, the HARQ-ACKs to be sent in uplink subframes in order of the downlink subframes in the FDD downlink frequency spectrum and the downlink subframes in the FDD uplink frequency spectrum; or
  in a case where a number of corresponding downlink subframes in the FDD downlink frequency spectrum or the FDD uplink frequency spectrum is more than 1, mapping the second downlink subframe group and then the first downlink subframe group, or mapping the downlink subframes in order of subframe indexes.

11. The method according to claim 1, wherein when sending the HARQ-ACK response information corresponding to the downlink subframe according to the determined HARQ timing, a path loss (PL) parameter of a physical uplink control channel sending the HARQ-ACK response information is estimated according to downlink subframes in the FDD uplink frequency spectrum.

12. A non-transitory computer readable storage medium including a set of instructions which is executed to cause at least one processor to perform the method for sending the response information claimed in claim 1.

13. An apparatus for sending response information comprising:

a processor; and
  a memory for storing instructions executable by the processor;
  wherein the processor is configured to:
    determine a Hybrid Automatic Repeat reQuest (HARQ) timing corresponding to a downlink subframe, wherein the downlink subframe is a downlink subframe, for which a feedback of HARQ-ACK response information is needed, wherein the downlink subframe is to be transmitted with frequency spectrum sourced from a Frequency Division Duplexing (FDD) downlink frequency spectrum and a FDD uplink frequency spectrum; and
    send the HARQ-ACK response information corresponding to the downlink subframe according to the determined HARQ timing;
  wherein the processor is further configured to:
    group downlink subframes of an FDD system, for which a feedback of HARQ-ACK response information is needed, and set an HARQ timing corresponding to each downlink subframe group, and
    determine a downlink subframe group to which the downlink subframe belongs and then determine an HARQ timing corresponding to the downlink subframe group as the HARQ timing corresponding to the downlink subframe, according to information from the processor;

wherein the processor is configured to group downlink subframes whose corresponding subframes are downlink subframes into a first downlink subframe group and downlink subframes whose corresponding subframes are uplink subframes into a second downlink subframe group; or, group downlink subframes in the FDD downlink frequency spectrum whose corresponding subframes are downlink subframes into a first downlink subframe group, downlink subframes in the FDD downlink frequency spectrum whose corresponding subframes are uplink subframes into a second downlink subframe group, and downlink subframes in the FDD uplink frequency spectrum into a third subframe group, wherein for a downlink subframe having a subframe index n, a corresponding subframe of the downlink subframe having a subframe index n is a subframe located in the FDD uplink frequency spectrum and having a subframe index n+4.

14. The apparatus according to claim 13, wherein the processor is further configured to:
   in a case where corresponding subframes of the downlink subframes in the downlink subframe group are uplink subframes, set the downlink subframe group to adopt an HARQ timing corresponding to the FDD system; or
   in a case where the downlink subframes in the downlink subframe group are matched with the Time Division Duplexing (TDD) uplink and downlink configuration Q, set the downlink subframe group to adopt an HARQ timing corresponding to the TDD uplink and downlink configuration Q; or
   in a case where corresponding subframes of the downlink subframes in the downlink subframe group are downlink subframes, set the downlink subframe group to adopt a first HARQ timing.

15. The apparatus according to claim 13, wherein the processor is further configured to:
   set an HARQ timing corresponding to downlink subframes of an FDD system, for which a feedback of HARQ-ACK response information is needed, as a second HARQ timing; and
   determine the HARQ timing corresponding to the downlink subframe according to the setting.

16. The apparatus according to claim 13, wherein
   the processor is configured to determine, according to the determined HARQ timing, HARQ-ACKs to be sent in uplink subframes in order of the downlink subframes in the FDD downlink frequency spectrum and the downlink subframes in the FDD uplink frequency spectrum, in a case where a single-cell Physical Uplink Control Channel (PUCCH) format 1b with channel selection is configured for use to send the HARQ-ACK response information; or map the second downlink subframe group and then the first downlink subframe group, or map the downlink subframes in order of subframe indexes, in a case where a number of corresponding downlink subframes in the FDD downlink frequency spectrum or the FDD uplink frequency spectrum is more than 1; or
   the processor is configured to send, according to the determined HARQ timing, the HARQ-ACK response information by taking the downlink subframes in the FDD downlink frequency spectrum to which uplink subframes correspond as downlink subframes corresponding to a primary serving cell in a carrier aggregation scenario and the downlink subframes in the FDD uplink frequency spectrum as downlink subframes corresponding to a secondary serving cell in the carrier aggregation scenario, in a case where a PUCCH format 1b with channel selection in the carrier aggregation scenario is configured for use to send the HARQ-ACK response information; or
   the processor is configured to determine, according to the determined HARQ timing, the HARQ-ACKs to be sent in uplink subframes in order of the downlink subframes in the FDD downlink frequency spectrum and the downlink subframes in the FDD uplink frequency spectrum, in a case where a PUCCH format 3 is configured to send the HARQ-ACK response information; or map the second downlink subframe group and then the first downlink subframe group, or map the downlink subframes in order of subframe indexes, in a case where a number of corresponding downlink subframes in the FDD downlink frequency spectrum or the FDD uplink frequency spectrum is more than 1.

* * * * *